April 9, 1929.  L. W. THOMPSON  1,708,809

PRESSURE MEASURING INSTRUMENT

Filed Nov. 1, 1927

Inventor:
Louis W. Thompson,
by
His Attorney.

Patented Apr. 9, 1929.

1,708,809

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

PRESSURE-MEASURING INSTRUMENT.

Application filed November 1, 1927. Serial No. 230,328.

The present invention relates to pressure-measuring instruments and while it is adapted for use in any instance where pressure is to be measured, it is more particularly adapted for use as a pressure-measuring instrument in a flow meter for measuring the flow of fluid through pipes. Accordingly I have specifically illustrated and described my invention as embodied in a flow meter. It is to be understood, however, that this is only by way of example and that the invention is not limited to this application.

The invention relates especially to such instruments of what may be termed the electric transformer type, this being the type disclosed in the patent to Jacob W. McNairy and myself, No. 1,560,951, patented Nov. 10, 1925. An instrument of such type is in the nature of an electrical transformer wherein the primary comprises a winding associated with the trailing leg of the U-tube and the secondary comprises liquid, such as mercury, which is a conductor of electricity and which in rising in the trailing leg of the U-tube provides an annular ring or loop of liquid surrounding the primary winding. The liquid ring or loop forms a closed secondary having a single turn which varies in cross section as the liquid rises and falls in the trailing leg of the U-tube. A measuring circuit including a source of alternating potential is connected to the primary winding and there is created in such circuit a flow of current which varies directly with the cross sectional area of the liquid ring which in turn is a function of its height. This current is then measured to give a measure of the fluid flow and may be integrated to give the total flow.

With an instrument of this type, the mercury in the U-tube is acted on directly by the pressure or pressure difference to be measured and this being the case, considerable change in pressure difference is required to effect sufficient deflection of the mercury in the U-tube to render the instrument practicable. The instrument, therefore, is not well adapted for measuring small pressures or small pressure differences.

The object of my present invention is to provide an improved pressure-measuring instrument of the type referred to which is adapted for measuring accurately relatively small changes in pressure or pressure differences, and for a consideration of what I believe to be novel and my invention, attention is directed to the accompanying description and the claims appended thereto.

Figure 1:
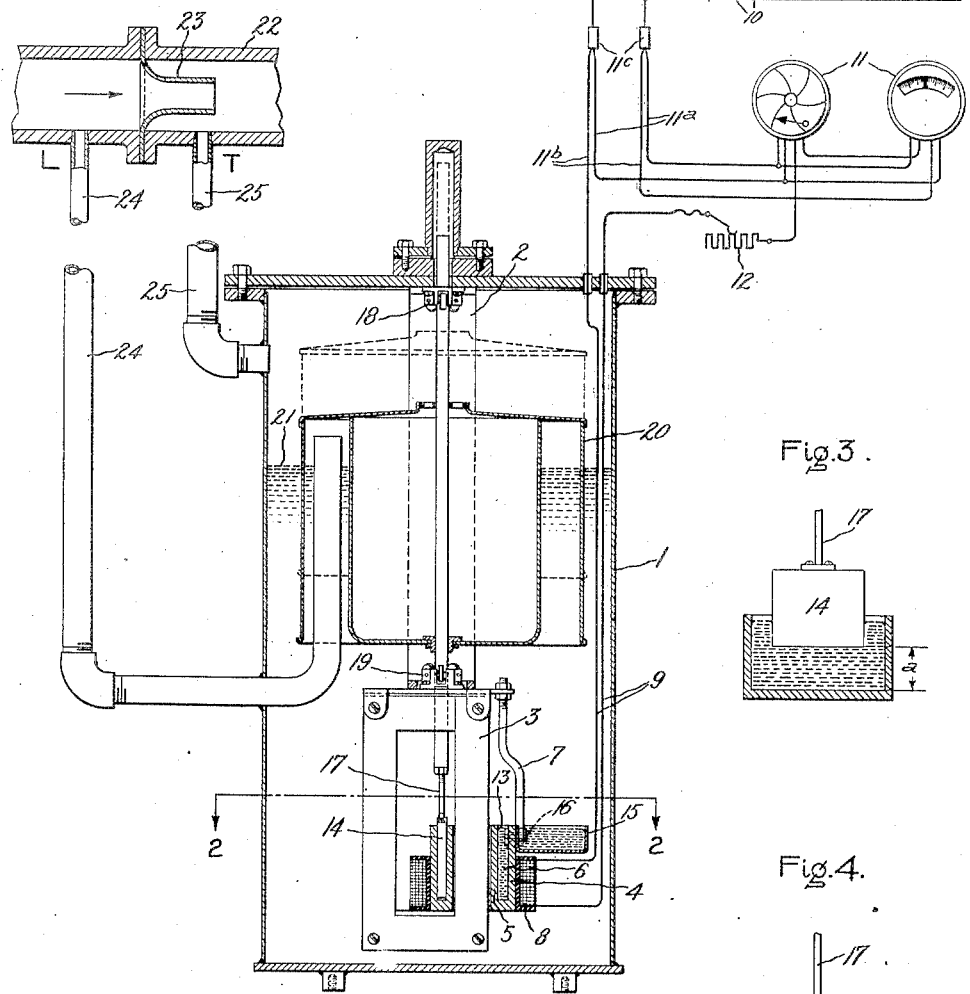
Figure 3:
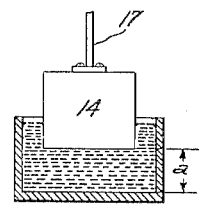
Figure 4:
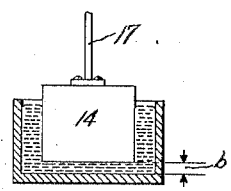
Figure 2:
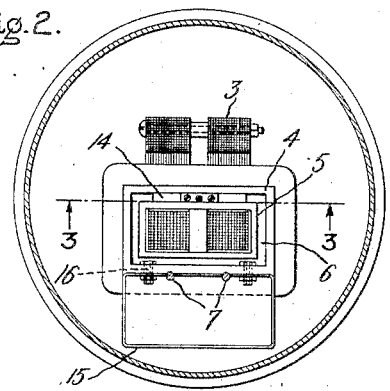

In the drawing, Fig. 1 is a sectional view of a flow meter embodying my invention; Fig. 2 is a section taken on line 2—2 Fig. 1, and Figs. 3 and 4 are detail sectional views illustrating the operation of the instrument, the sections being taken on line 3—3, Fig. 2, looking in the direction of the arrows.

According to my present invention, I provide a transformer structure comprising a winding which forms the primary of the transformer and a liquid loop which forms the secondary of the transformer, an indicating circuit being connected to the transformer primary. However, instead of raising and lowering the liquid level to effect changes in the resistances of the liquid loop, I maintain the liquid always at its maximum level and I then provide in connection with it a separating member, preferably in the form of a piece of insulated material, which is raised and lowered relatively to the liquid loop to separate or split the same. The separator member is then moved by some suitable means which is responsive to changes in pressure or pressure-difference and which is of as sensitive a nature as is desired. Preferably, I use a pressure or pressure-difference responsive device of an inverted bell type because with such a type a comparatively large movement may be obtained with a comparatively small change in pressure or pressure difference.

Referring to the drawing, 1 indicates a sealed casing which may be formed of any suitable material. Connected to the underside of the cover for the casing is a bracket 2 on which is supported the rectangular core 3 of a transformer, such core being made of laminations as is usual in connection with transformer core construction. Surrounding one leg of the transformer core is a structure comprising walls 4 and 5 which define a continuous chamber 6 around such transformer leg. In the present instance, continuous chamber 6 is rectangular. The walls forming chamber 6 are supported by rods 7 which at their upper ends are connected to the top of the transformer core. Surrounding chamber 6 is a primary transformer winding 8, the terminals of which are connected by lead wires 9 to a source of alternating current 10, there being included in the circuit suitable measuring instruments 11 which may be instruments for integrating, indicating and recording the flow of current in such circuit. In the drawing, the potential and current connections 11ª and 11ᵇ and fuses 11ᶜ for the instruments are indicated.

It is to be understood that this illustration is only by way of example and that the instruments will be connected into the circuit according to their nature so as to give the desired results. In the circuit also is shown an adjustable line resistance 12.

Chamber 6 is filled with a liquid 13 which is a conductor of electricity, mercury for example. This liquid forms a closed secondary for the transformer.

In chamber 6 and adapted to be raised and lowered therein is a separating member 14 formed of suitable insulating material. It is in the form of a rectangular plate and when it is raised and lowered in the chamber, it will be seen that it serves to separate or split the liquid loop, thus varying the electrical resistance of the liquid loop. To take care of the change in volume of liquid in chamber 6 when separator member 14 moves, there is provided an overflow well 15 which is mounted on the side of wall 4 adjacent its upper end and is connected to chamber 6 by passages 16. Well 15 is of a size such that the amount of liquid displaced by member 14 effects only slightly the liquid level.

Connected to member 14 is a rod 17 carried in suitable upper and lower guides 18 and 19, such guides being shown in the present instance as being in the form of spaced rollers. Mounted on rod 17 is an inverted annular bell float 20 which rides in a liquid 21 with which casing 1 is partially filled. Liquid 21 may be oil, for example. It is to this bell float that the pressure or pressure difference to be measured is applied. In the present instance, 22 indicates a conduit through which a fluid to be metered flows and 23 indicates a pressure-difference-creating device therein, a pressure-difference-creating device of known type being illustrated, it being the type disclosed in the patent to Dodge, No. 1,298,471, granted March 25, 1919. The leading and trailing pipes 24 and 25 connect pressure-difference-creating device to the inside and outside of bell float 20 in the usual manner.

The operation is as follows:

At zero or no flow through conduit 22, the parts stand in the positions shown in Fig. 1, the bell float 20 and the separator member 14 being in the lowermost positions. At this time the mercury loop which forms the secondary of the transformer is split almost entirely in two, it being complete only at its lowermost portion. There is a small flow of current in the circuit 9, but instruments 11 are compensated to read zero with this small current flow. The mercury ring may be split entirely in two by member 14 but this is not done preferably because of the fact that a considerable movement of the member 14 in a vertical direction would be required initially before the mercury would form a complete ring. Also, it is desirable to have an initial mercury ring on account of the characteristics of the device at low flow.

When flow of fluid takes place through conduit 22, the leading and trailing pressures set up by the pressure-difference-creating device are applied to bell float 20, the float being raised in accordance with the pressure difference created. As the float is raised it lifts separator member 14 thereby decreasing the amount the mercury loop is split (in other words, increasing the effective height of the mercury loop). This effects an increase in flow of current in the primary circuit of the transformer, such increase in flow of current being measured by the instruments 11. As flow of fluid through conduit 22 increases and decreases, float 20 will be raised and lowered, thereby raising and lowering separator member 14 and increasing and decreasing the flow of current in the primary circuit. The flow of current thus serves as a measure of the differential pressure which in turn is a measure of the flow of fluid through conduit 22. Float 20 may be shaped and constructed to give the desired vertical movement for the change in pressure available for moving it, so that a comparatively large vertical movement may be obtained with a comparatively small change in pressure or pressure difference. In this connection, it will be noted that inverted bell float 20 is required to displace only a comparatively small quantity of mercury, this being the quantity represented by the volume of separator member 14. This means, therefore, that the bell float is required to do but little work in moving the separator member. Figs. 3 and 4 show different positions of the separator member in the chamber, Fig. 3 showing a position of it adjacent to the top of the chamber, while Fig. 4 shows it lower in the chamber 6, leaving a liquid loop of comparatively small height under it. In these figures, the distances $a$ and $b$ represent the effective depths of the liquid loop. The shape of the chamber 6, the effective depth of the liquid loop at zero flow and the external resistance of the primary circuit may be adjusted as found desirable or as required, to give the desired characteristic relation between the current flowing in the primary circuit and the quantity represented by the pressure difference to be measured.

By the above described arrangement, it will be seen that I avoid displacing all the liquid which forms the liquid loop of the transformer secondary, and instead displace only a small portion of it. This means that only a small amount of force is required to effect the changes in the effective resistance of the liquid loop. Then by utilizing a device which in response to comparatively small changes in pressure or pressure difference is capable of moving the separator through the desired travel, I thereby provide an arrangement capable of measuring accurately comparatively small changes in pressure or pressure difference.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a measuring device, walls defining a chamber in the form of a loop, a primary transformer winding associated with said chamber, a liquid in said chamber which is a conductor of electricity and which forms a secondary transformer winding in the form of a liquid loop, an insulating means for dividing said liquid loop, means for moving said insulating means to vary the effective depth of said liquid loop, and a measuring circuit connected to said primary winding.

2. In a measuring device comprising as a part of its structure means providing a liquid loop which is a conductor of electricity, a device formed of insulating material which is moved in response to changes in the value to be measured for splitting the liquid loop axially to vary the effective cross-sectional area of the liquid loop.

3. In a measuring device, a transformer core, a primary winding thereon adapted to have a measuring circuit connected to it, means providing a secondary winding for the core in the form of a loop of conducting liquid, and a movable member formed of insulating material for splitting the liquid loop axially to vary the effective cross-sectional area of said liquid loop.

4. In a measuring device, a transformer core, a primary winding thereon adapted to have a measuring circuit connected to it, means providing a secondary winding for the core in the form of a loop of conducting liquid, a separator formed of insulating material movable relatively to the loop for splitting the liquid loop axially to vary the effective cross-sectional area of said liquid loop, and means for positioning said separator in response to variations in the value of the quantity to be measured.

5. In a measuring device, a transformer core, a primary winding thereon adapted to have a measuring circuit connected to it, means providing a secondary winding on the core in the form of a loop of conducting liquid, a separator formed of insulating material movable relatively to the loop for splitting the loop in an axial direction to vary the effective cross-sectional area of said liquid loop, and a pressure-responsive device for positioning said separator.

6. In a measuring device comprising as a part of its structure means providing a liquid loop which is a conductor of electricity, an insulating device which is moved in response to changes in the value to be measured to split said liquid loop axially to a greater or lesser degree whereby its effective cross-sectional area is varied.

In witness whereof, I have hereunto set my hand this 31st day of October, 1927.

LOUIS W. THOMPSON.